UNITED STATES PATENT OFFICE 1,984,945

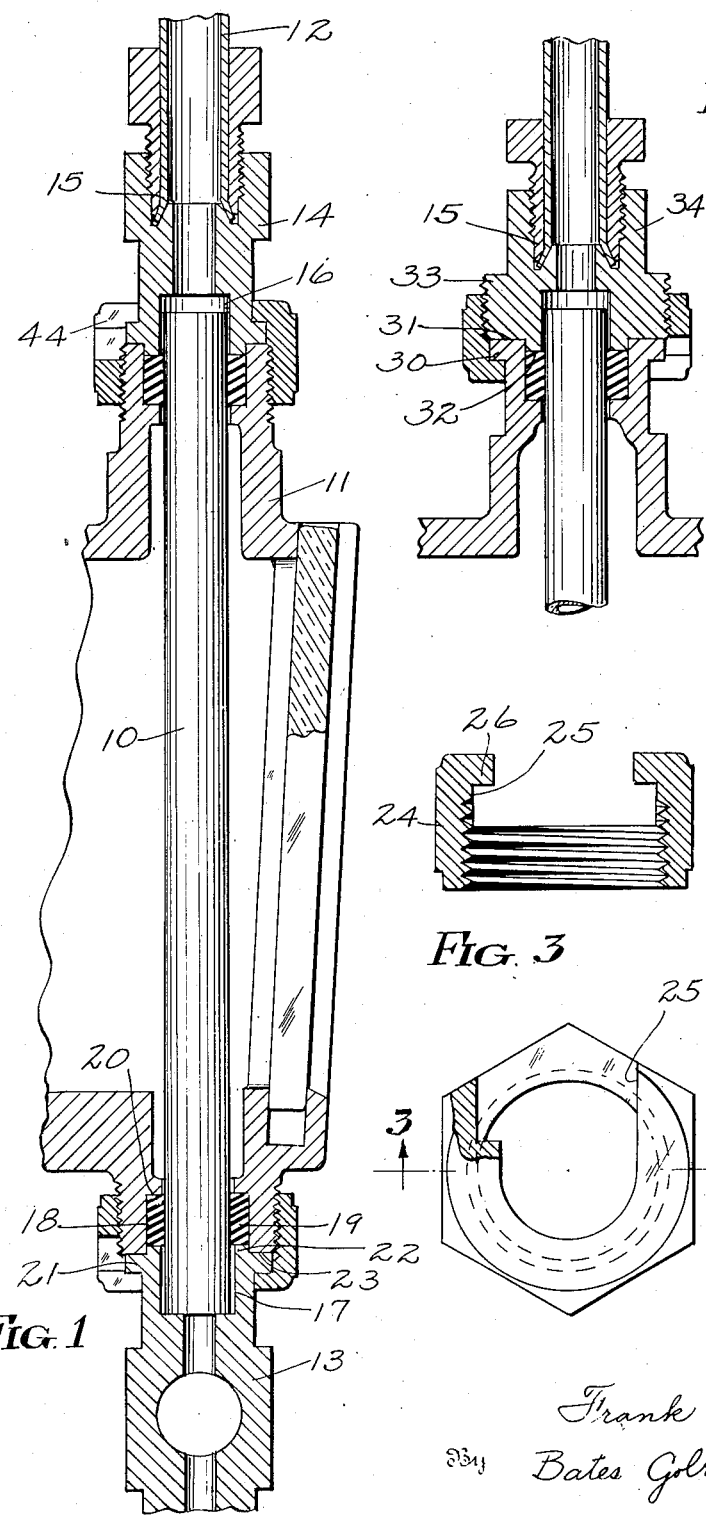

GAUGE GLASS APPARATUS

Frank M. Roby, Cleveland, Ohio

Application September 19, 1932, Serial No. 633,751

7 Claims. (Cl. 73—54)

This invention relates to improvements in steam and water connections to water gauge glass protectors.

A gauge glass protector in common use is shown in Patent No. 1,105,150 issued to D. R. McBain and a common method of making the connections at the ends of the gauge glass is there illustrated. For example, the packing glands at either end of the water glass are longer than that known to be necessary to make tight joints. For the lower connection, the lower packing gland is formed between the protector and the bottom water glass cock, one of these forming a gland and the other a nut, with a gasket inserted between the two. The gasket is compressed by relative rotary movement between the protector and the cock, and as the protector must be left in a certain position in order to connect the protector drain pipe, the connection is often drawn up too tight. The result is that many gauge glasses are broken. For the top connection of the glass a similar packing arrangement is provided, in which the parts are drawn together to compress the gasket, reliance being placed upon the operator's judgment, as to whether the proper point is reached.

While the shoulder in the bottom water glass cock prevents the water glass extending too far beyond the lower gasket the absence of such a shoulder in the top gasket compressing member permits a water glass being carelessly applied so as to have little or no portion of the water glass extending beyond the outer end of the lower gasket. Such a condition together with excessive extrusion of the gasket material along the outer surface of the water glass caused by unlimited tightening of the gasket compressing member frequently results in one of the most feared water-glass conditions namely the covering over of the end of the water glass with the extruded gasket material whereby a false level of water is shown in the water glass. The deep, internally threaded stuffing boxes of the McBain design are very objectionable in that the top outer portion of the gasket is forced out into the threads and sheared off when the gasket is compressed. In service the rubber gasket material becomes vulcanized to the walls of the stuffing box, the depth of the same and the internal threads causing much additional effort to clean the stuffing boxes preparatory to applying new gaskets. To prevent twisting the comparatively soft annealed copper steam pipe, the joint between the pipe and the top gasket compressing member must be loosened before this member can be unscrewed from the protector or the protector unscrewed from the bottom boiler connection.

The object of the present invention therefore is to improve the steam and water connections to water gauge glass protectors so as to provide stuffing boxes having smooth bores and fixed lengths for compressing the gaskets, to provide means for centering the water glass lengthwise, and for effecting the connections without requiring the protector to be rotated with reference either to the top steam pipe or to the bottom water glass cock and without breaking the connection of the steam pipe to the gasket compressing member at the top of the water glass.

I have overcome some of the present difficulties by providing end connections for the water gauge glass, only sufficiently separated to allow for the expansion of the glass due to the rise in temperature during use so that the position of the gauge glass, as finally connected, will be known within very narrow limits. Also, I provide interfitting shoulders, between which the compression of the gasket is purposely limited to a positive amount so that the parts may be drawn up to a fixed stop that assures a proper compression of the gasket without breakage of the glass and prevents excessive extrusion of the gasket material along the outer surface of the water glass.

Other advantages of my invention will be apparent from the following description of the drawing, the essential features of which are summarized in the claims.

In the drawing, Fig. 1 is a general sectional view of the connection; Fig. 2 is a plan view partly in section of a coupling nut, used with my device; Fig. 3 is a sectional view along the lines 3—3 of Fig. 2, while Fig. 4 is a modification of the top connections shown in Fig. 1.

Fig. 1 shows a water gauge glass 10, surrounded by a gauge glass protector 11, and having a steam connection at the top with a boiler, and a water connection at the bottom through a water glass cock 13. The upper connection shown in Fig. 1 utilizes an intermediate member 14 which provides a connection as at 15 with the end of a flexible steam conduit 12. A recess 16 in the top connecting member 14 and a recess 17 in the bottom cock are spaced apart sufficiently far to take a standard length glass and to allow for the expansion of the glass when in use.

As the further details of the top and bottom connections in this form are practically identical, the bottom connection only will be described. A recess or cavity 18 is formed in the end of the gauge glass protector for the reception of a packing ring 19. For this purpose, I prefer to use a rubber ring having imbedded metal washers on each end, which closely fit the outside diameter of the water glass and engages a shoulder 20 at the inner end of the cavity. Such a ring is described in my copending application, Serial No. 622,712 filed July 15th, 1932. The bottom cock may have outwardly extending annular flange 21 formed integrally therewith and may have an annular projection 22 adjacent the flange. This projection is adapted to enter the cavity 18 of the protector to properly center the parts. The distance between the shoulder 20 on the protector and the end of the projection 22 is such that when the flange 21 is drawn up tightly against the end 23, the packing is compressed a sufficient amount to prevent leakage around the end of the water glass when the boiler is brought up to working pressure, but not great enough to break the glass. The proper relationship of the parts having been once determined by the use of a standard packing ring, a correct joint and safety is always assured.

The coupling nut wiich is used to make the connection in Fig. 1 is shown in larger views Figs. 2 and 3. The nut 24 is illustrated as being a union nut and as having part of one side open, as at 25, sufficiently to permit it to be slid laterally over the flange 21, and as having an inwardly extending collar 26 which is adapted to rest behind the flange. The nut is internally threaded and is adapted to coact with the externally threaded end of the protector. To connect the protector to the bottom water glass cock the open sided nut is first applied and allowed to slide down upon the extension of the cock. The protector with the water glass and packing in position is then placed on the flange 21, the annular projection 22 centering the part, as previously described. The nut is then drawn up until leakage stops, and the extent of the drawing up is limited when the end 23 of the protector makes a metal-to-metal contact with the flange 21. This assures a connection between the parts which is always rigid, whereas with the customary connection, the threads of the stuffing boxes become worn and any lessening of the longitudinal pressure on the threads by the gasket material causes the assembly to lose its original rigidity. Moreover in the customary connection, an excessive amount of packing material is apt to be used.

The steam supply pipe 12 can be connected or disconnected to the top of the protector without twisting the pipe 12 or disturbing the steam tight joint between the pipe 12 and the gasket compression member 14 by simply screwing down or unscrewing the hexagon shaped open-sided nut 44. The lower portion of the extension at the top of the protector 11 is hexagon shaped to engage a wrench as the gasket compressing members are drawn down into proper position by the tightening of the packing nuts and which is accomplished without any rotary movement of the compressing members.

In Fig. 4 I have shown a modification of the top connection illustrated in Fig. 1. This is substantially a reversal of the parts, there being an outwardly extending flange 30 on the end of the protector abutting a shoulder 31 on the connecting member 34. As in the former case, there is an annular projection 32 adapted to center the parts and to compress the gasket a predetermined degree. The member 34 is provided with an external thread 33 upon which the open-sided coupling nut is drawn up.

An advantage of my invention is the fact that the gauge glass protector may be attached and the gaskets compressed without rotating the protector, thus avoiding undue strains upon the water glass formerly caused by excessive gasket compression resulting from the necessity of revolving the protector to a certain position after proper gasket compression had been obtained. Furthermore, the utilization of a packing ring together with a connecting device by means of which a definite predetermined limiting pressure may be placed upon the packing assures a tight joint when the coupling nut is drawn up tight and prevents the pyramiding of the extruded gasket material along the outer surface of the water glass. Furthermore, the centering arrangement assures a proper positioning of the glass with reference to the adjacent metallic parts. These movements materially simplify the maintenance work in connection with gauge glasses, reduce the breakage and insure equalization of the projecting end of the glass beyond the packing rings, thus obviating the possibility of the packing being forced over the end of the glass and partially or entirely closing it, thus causing it to show a false level.

I claim:—

1. In a gauge glass apparatus, the combination with a gauge glass, of a casing surrounding the same, a fluid carrying conduit in abutting engagement with the end of the casing and having an opening into which part of the glass extends, said conduit having a reduced exterior portion that provides a shoulder means associated with the casing and conduit for centering them with reference to the gauge glass, threaded means bearing against the shoulder for locking the casing and conduit together, said means including a nut having a slot therein, by means of which the nut may be assembled on the conduit behind the shoulder, whereby the casing and conduit may be locked together without rotating either with reference to the other.

2. In a gauge glass apparatus, the combination with a gauge glass, of a casing surrounding the same, the casing terminating in a stuffing box, having a smooth bore and a threaded exterior, a fluid carrying conduit having a portion thereof disposed within said bore and co-operating with the wall of the bore to center the conduit with respect to the casing, and having a flange spaced from the end of the conduit, one side of the flange being in abutting engagement with the end of the casing, a locking unit engaging the other side of the flange and being internally threaded to coact with the threaded part of the casing, and said nut being slotted for withdrawal from the conduit when moved laterally with reference thereto after it is disconnected from the casing.

3. In a gauge glass apparatus, the combination with a gauge glass, of a casing surrounding the same, said casing having a stuffing box associated therewith, packing material within the stuffing box, a fluid carrying conduit, means for locking the conduit to the casing, said means being operative to effect a fixed limit of compression of the packing, said means including a union nut which is slotted transversely whereby it may be removed by lateral movement of the nut with reference to the gauge glass.

4. In a gauge glass apparatus, the combination with a gauge glass, of a casing surrounding the same, one end of the casing terminating in an externally threaded stuffing box, a packing ring therein, a fluid carrying member having an intermediate cylindrical portion of less external diameter than the external cross sectional dimension of the end portions thereof, one of the end portions of said member having a flange, and having an opening into which part of the gauge glass extends and a second portion adapted to compress the packing in close fitting engagement with the wall of the stuffing box, and threaded means for locking the casing and the member together without rotating either with respect to the other, said means including a slotted nut that is adapted to be laterally applied to an axial position behind said flange before the member is centered on the casing.

5. In a gauge glass apparatus the combination with a gauge glass, of a casing surrounding the same, the casing terminating in a smooth bore stuffing box threaded externally, packing material therein, a gauge cock having an extension, and having a flange on the extension, means for centering the extension radially within the casing stuffing box, said extension being provided with a passageway therein in communication with an end of the glass, threaded means for locking the casing to the gauge cock extension without relative rotation between the casing and the extension, the last named means including a slotted nut that is adapted to be applied laterally to an axial position behind the flange on the extension before the casing is centered on the extension.

6. In a water gauge apparatus, the combination of a casing providing visability of the water level therein and terminating in an extension, a water gauge cock having an extension, said extensions having inter-communicating central passageways therein and provided at their respective ends with means for centering the extensions while they are in abutting engagement, one of the extensions having a flanged end portion, and the end portion of the other extension being threaded externally, and a slotted nut that is adapted to be applied laterally to an axial position behind the flange on the one extension before the same is centered on the other extension, whereby the casing and the cock may be locked together without relative rotation of one to the other.

7. In a gauge structure, a gauge cock having a fixed extension provided with a peripheral flange adjacent its free extremity, an open sided swivel nut associated with said extension, a gauge glass support including a threaded hollow nipple, a packing within the nipple, said extension having a portion thereof engaging an end of the packing, and being adapted to be received within the nipple and to compress the packing when the nut is threaded on the nipple, and a flange on the extension, said flange being positioned at a point for engaging the end of the nipple for limiting the compression that can be applied to the packing.

FRANK M. ROBY.